(12) United States Patent
Hahn et al.

(10) Patent No.: US 9,769,837 B2
(45) Date of Patent: Sep. 19, 2017

(54) RESOURCE ALLOCATION METHOD IN WIRELESS COMMUNICATION SYSTEM AND APPARATUS USING THE SAME

(71) Applicants: LG ELECTRONICS INC., Seoul (KR); INDUSTRY-ACADEMIC COOPERATION FOUNDATION, YONSEI UNIVERSITY, Seoul (KR)

(72) Inventors: Genebeck Hahn, Seoul (KR); Jingu Choi, Seoul (KR); Seonglyun Kim, Seoul (KR); Beomhee Lee, Seoul (KR); Jaehoon Chung, Seoul (KR); Eunjong Lee, Seoul (KR)

(73) Assignees: LG ELECTRONICS INC., Seoul (KR); INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 112 days.

(21) Appl. No.: 14/759,392

(22) PCT Filed: Jan. 7, 2014

(86) PCT No.: PCT/KR2014/000121
§ 371 (c)(1),
(2) Date: Jul. 6, 2015

(87) PCT Pub. No.: WO2014/107078
PCT Pub. Date: Jul. 10, 2014

(65) Prior Publication Data
US 2016/0007363 A1    Jan. 7, 2016

Related U.S. Application Data

(60) Provisional application No. 61/479,844, filed on Jan. 7, 2013.

(51) Int. Cl.
*H04W 72/08* (2009.01)
*H04W 72/04* (2009.01)
(Continued)

(52) U.S. Cl.
CPC ......... *H04W 72/085* (2013.01); *H04W 24/08* (2013.01); *H04W 72/04* (2013.01);
(Continued)

(58) Field of Classification Search
CPC ... H04W 72/085; H04W 24/08; H04W 72/04; H04W 72/0453; H04W 88/02; H04W 88/08
(Continued)

(56) References Cited

U.S. PATENT DOCUMENTS 7,873,074 B1 * 1/2011 Boland ............... H04L 12/14
   370/468
2007/0115879 A1   5/2007 Shin et al.
(Continued)

OTHER PUBLICATIONS

PCT International Application No. PCT/KR2014/000121, Written Opinion of the International Authority dated Apr. 18, 2014, 1 page.

*Primary Examiner* — Obaidul Huq
(74) *Attorney, Agent, or Firm* — Lee Hong Degerman Kang Waimey

(57) ABSTRACT

Provided are a method of allocating a resource in a wireless communication system and an apparatus using the method. The method includes: measuring a variation of a data usage pattern or density of user equipments located in a region for providing a service; determining whether the variation is greater than or equal to a threshold; and determining a resource allocation type of the region for providing the service on the basis of the determination result.

6 Claims, 12 Drawing Sheets

(51) Int. Cl.
*H04W 24/08* (2009.01)
*H04W 88/02* (2009.01)
*H04W 88/08* (2009.01)

(52) U.S. Cl.
CPC ........ *H04W 72/0453* (2013.01); *H04W 88/02* (2013.01); *H04W 88/08* (2013.01)

(58) Field of Classification Search
USPC .................................................. 370/241, 252
See application file for complete search history.

(56) References Cited

U.S. PATENT DOCUMENTS

| | | |
|---|---|---|
| 2009/0215452 A1 | 8/2009 | Balasubramanian et al. |
| 2010/0216477 A1* | 8/2010 | Ryan .................... H04W 16/04 455/449 |
| 2010/0232384 A1 | 9/2010 | Farajidana et al. |
| 2011/0268012 A1 | 11/2011 | Jo et al. |
| 2012/0225662 A1 | 9/2012 | Jo et al. |

* cited by examiner

RESOURCE ALLOCATION METHOD IN WIRELESS COMMUNICATION SYSTEM AND APPARATUS USING THE SAME

CROSS-REFERENCE TO RELATED APPLICATIONS

This application is the National Stage filing under 35 U.S.C. 371 of International Application No. PCT/KR2014/000121, filed on Jan. 7, 2014, which claims the benefit of U.S. Provisional Application No. 61/749,844, filed on Jan. 7, 2013, the contents of which are all hereby incorporated by reference herein in their entirety.

BACKGROUND OF THE INVENTION

Field of the Invention

The present invention relates to wireless communications, and more particularly, to a method of allocating a radio resource in a wireless communication system and an apparatus using the method.

Related Art

To overcome a restriction of a service area and a limitation of a user capacity, the wireless communication system provides a communication service by dividing the service area into a plurality of cells. This is referred to as a multi-cell environment.

Types and features of service traffic and application programs that can be used in the wireless communication system have been diversified. Accordingly, a wireless data usage pattern of a user equipment (UE) has also been diversified. For example, a UE which uses a large amount of data and a UE which uses a small amount of data may exist at the same time in the same network. In addition, the same UE may have a different data pattern in use according to a place, a current speed, etc. If a data usage pattern differs from one UE to another, the wireless communication system may preferably provide a service suitable for a data usage pattern of each UE. In doing so, an effective network management is possible, and a service suitable for a requirement of a UE can be provided from a perspective of the UE.

Meanwhile, in order for the wireless communication system to effectively use a limited frequency, time resource and to decrease a network interference, techniques for allocating a wireless resource have been proposed, such as frequency reuse, carrier aggregation (CA), inter-cell interference coordination (ICIC), etc.

The frequency reuse is for adjusting a bandwidth by dividing an available frequency band by a frequency reuse factor K so that neighboring cells use different frequency bands. The CA is for aggregating and using necessary carriers by dividing a system band into a plurality of carriers. The ICIC is for dividing and using a radio resource in a frequency or time axis through cooperation between neighboring cells to decrease interference between base stations (BSs) of a network.

As such, many techniques related to radio resource allocation have been proposed, but a method of allocating a radio resource by considering a data amount required by UEs in a network has not been proposed yet. If the radio resource is allocated without consideration of the data amount required by the UEs, a quality of experience (QoE) of the UE may not be satisfied, or the radio resource is wasted, thereby causing deterioration in system performance.

For example, in long term evolution (LTE) release (Rel)-10, a BS controls interference between BSs by applying a time-domain ICIC technique. When the BS transmits a frame including a plurality of subframes to the UE, not all subframes contain data, but a special subframe called an almost blank subframe (ABS) is used. A physical downlink shared channel (PDSCH) is not used for a specific time.

However, although interference can be decreased by giving more weight to the ABS, the QoE of the UE cannot be satisfied since a throughput of the BS is decreased. Without the ABS, that is, without applying the ICIC technique, a QoE of a cell-edge UE is significantly decreased due to interference between BSs.

As such, since the conventional technique determines a radio resource to be allocated without consideration of a data amount required by UEs in a network, the radio resource is used ineffectively.

SUMMARY OF THE INVENTION

The present invention provides a resource allocation method in a wireless communication system, and an apparatus using the method.

In an aspect, a method of allocating a resource in a wireless communication system is provided. The method comprises: measuring a variation of a data usage pattern or density of user equipments located in a region for providing a service; determining whether the variation is greater than or equal to a threshold; and determining a resource allocation type of the region for providing the service on the basis of the determination result.

In another aspect, an apparatus is provided. The apparatus comprises a radio frequency (RF) unit for transmitting or receiving a radio signal; and a processor operatively coupled to the RF unit, wherein the processor is configured for: measuring a variation of a data usage pattern or density of user equipments located in a region for providing a service; determining whether the variation is greater than or equal to a threshold; and determining a resource allocation type of the region for providing the service on the basis of the determination result.

Since a required data amount of a user equipment is recognized and a radio resource is allocated according thereto, the wireless resource can be effectively used. As a result, a quality of experience (QoE) of the user equipment is increased.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with an IEEE 802.16e-based system. The UTRA is a part of a universal mobile telecommunication system (UMTS). $3^{rd}$ generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is evolved from the 3GPP LTE.

Figure 1:
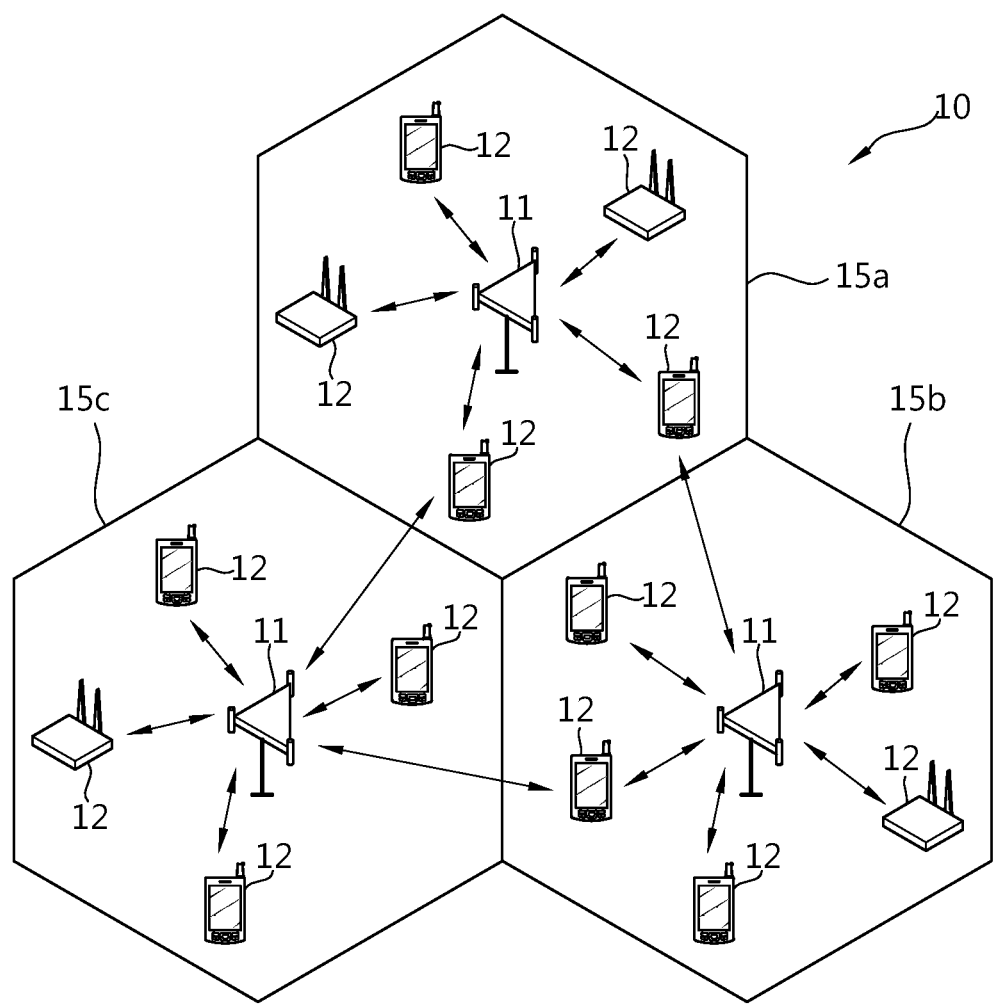
FIG. 1 shows an example of a wireless communication system.

FIG. 1 shows an example of a wireless communication system.

A wireless communication unit 10 includes at least one base station (BS) 11. Respective BSs 11 provide communication services to specific geographical regions (generally referred to as cells) 15a, 15b, and 15c. The cell can be divided into a plurality of regions. The BS 11 is generally a fixed station that communicates with a user equipment (UE) 12 and may be referred to as another terminology, such as an evolved node-B (eNB), a base transceiver system (BTS), an access point, etc.

The UE 12 may be fixed or have a mobility. Hereinafter, it is premised that the UE 12 has the mobility. The UE may be referred to as another terminology, such as a mobile station (MS), a user terminal (UT), a subscriber station (SS), a wireless device, a personal digital assistant (PDA), a wireless modem, a handheld device, etc.

The UE belongs to one cell in general. A cell to which the UE belongs is called a serving cell. A BS which provides a communication service to the serving cell is called a serving BS. The serving BS may provide one or a plurality of serving cells. Other cells adjacent to the serving cell are called neighbor cells.

In general, a downlink denotes communication from the BS 11 to the UE 12, and an uplink denotes communication from the UE 12 to the BS 11.

Layers of a radio interface protocol between the UE 12 and the BS 11 can be classified into a first layer (L1), a second layer (L2), and a third layer (L3) based on the lower three layers of the open system interconnection (OSI) model that is well-known in the communication system.

A physical layer, i.e., the first layer, is connected to a medium access control (MAC) layer, i.e., a higher layer, through a transport channel. Data between the MAC and physical layers is transferred through the transport channel. Further, between different physical layers, i.e., between a physical layer of a transmitting side and a physical layer of a receiving side, data is transferred through a physical channel.

A radio data link layer, i.e., the second layer, consists of a MAC layer, an RLC layer, and a PDCP layer. The MAC layer is a layer that manages mapping between a logical channel and the transport channel. The MAC layer selects a proper transport channel to transmit data delivered from the RLC layer, and adds essential control information to a header of a MAC protocol data unit (PDU).

The RLC layer is located above the MAC layer and supports reliable data transmission. In addition, the RLC layer segments and concatenates RLC service data units (SDUs) delivered from an upper layer to configure data having a suitable size for a radio section. The RLC layer of a receiver supports a reassemble function of data to restore an original RLC SDU from the received RLC PDUs.

The PDCP layer is used only in a packet exchange area, and can perform transmission by compressing a header of an IP packet to increase transmission efficiency of packet data in a radio channel.

The RRC layer, i.e., the third layer, exchanges radio resource control information between the UE and the network in addition to controlling of a lower layer. According to a communication state of the UE, various RRC states (e.g., an idle mode, an RRC connected mode, etc.) are defined, and transition between the RRC states is optionally possible. In the RRC layer, various procedures related to radio resource management are defined such as system information broadcasting, an RRC access management procedure, a multiple component carrier setup procedure, a radio bearer control procedure, a security procedure, a measurement procedure, a mobility management procedure (handover), etc.

The wireless communication system may be any one of a multiple-input multiple-output (MIMO) system, a multiple-input single-output (MISO) system, a single-input single-output (SISO) system, or a single-input multiple-output (SIMO) system. The MIMO system uses a plurality of transmit antennas and a plurality of receive antennas. The MISO system uses a plurality of transmit antennas and one receive antenna. The SISO system uses one transmit antenna and one receive antenna. The SIMO system uses one transmit antenna and a plurality of receive antennas.

Although not shown in FIG. 1, the wireless communication system may further include a device for managing a plurality of BSs. Such a device is called a cloud-radio access network (C-RAN). The C-RAN may indicate a specific resource allocation method to be used by each BS managed by the C-RAN when a service is provided to a UE.

For communication with the BS, the UE performs cell search and selection. Through this process, the UE searches for the BS to perform the communication. In the conventional cell search process, a reference signal received power (RSRP) or a received signal strength indicator is used to search for a cell which sends a greatest signal strength. In this process, the UE may use a public mobile network identify (PLMN) to confirm whether the cell is a cell included in a network of an operator to whom the UE belongs, and if it is confirmed as a suitable cell, may perform an access. The PLMN may be acquired through a system information block (SIB) type 1 transmitted periodically by the cell.

Meanwhile, the wireless communication system may consist of heterogeneous networks. The heterogeneous network implies a network consisting of a macro cell and a plurality of small cells. The macro cell may support a plurality of UEs, and may imply a BS of which transmit power is high and coverage is wide. The small cell may support a smaller number of UEs than the macro cell, and may be a BS of which transmit power is low and coverage is narrow. That is, the heterogeneous network is a network in which each cell can have different coverage/transmit power and capacity. It is problematic to access a cell in the heterogeneous network simply according to a reception signal strength alone as in the conventional method.

For example, if a UE located within a coverage of a small cell selects a cell according to only a received signal strength, there is a high possibility of selecting the small cell. However, if the UE moves at a high speed, the UE will be out of the coverage of the small cell within a short time, and as a result, a handover to another cell must be performed. Therefore, in the long term, it may be more effective for the UE to select a macro cell having great coverage even if a reception signal strength is small in comparison with a case of selecting a small cell having a greatest reception signal strength. That is, it is necessary to consider a movement speed of the UE in a cell selection/reselection process.

In addition, it is also necessary to consider a data usage amount of the UE in the cell selection/reselection process. For example, a UE which uses a small amount of data has a high possibility of using the data only for a short period of time, and thus it is effective to select a cell in which the UE can receive a service most smoothly at the moment.

On the other hand, a UE which uses a large amount of data has a high possibility of using the data for a long period of time, and thus it is effective to select a cell in which a greater data rate can be provided for the long period of time. For example, regarding a cell which serves for a great number of UEs at a specific time, even if the cell cannot allocate many resource to a specific UE at the specific time, if other accessing UEs are UEs which use a less amount of data, there may be a case where more resources are allocated to the specific UE in the long term.

Accordingly, the present invention proposes a method for determining a data usage pattern of a UE by considering both a data usage amount and a movement speed of the UE, and for performing cell selection on the basis of the data usage pattern.

In addition, a data provision pattern of a BS may also be used in the aforementioned method. The data provision pattern may be a pattern in which a data amount that can be provided by the BS to the UE is indicated for each speed of the UE. Information for reporting the data provision pattern is called data provision pattern information. The BS may analyze the number of UEs currently being served, a required data amount of each UE, etc., to predict a data amount to be provided to a UE for accessing thereto, and may report this to the UE through the data provision pattern information.

Figure 2:
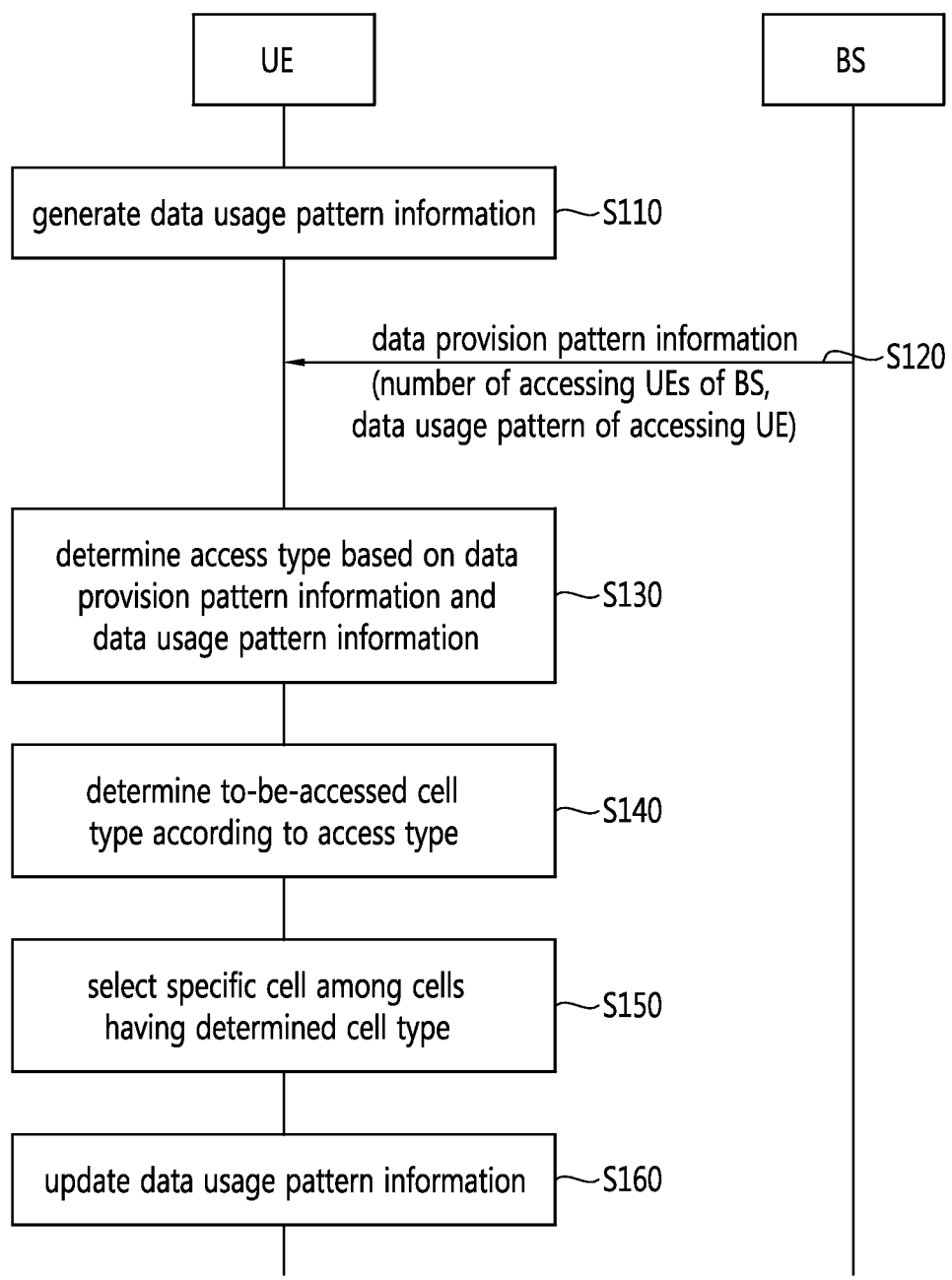
FIG. 2 shows a method of operating a UE according to an embodiment of the present invention.

FIG. 2 shows a method of operating a UE according to an embodiment of the present invention.

Referring to FIG. 2, the UE generates data usage pattern information (step S110).

The data usage pattern information and its generation process will be described below in detail.

The UE receives data provision pattern information from a BS (step S120).

The data provision pattern information may be generated based on the number of UEs which access the BS, a data usage pattern of the accessing UE, etc.

The UE determines an access type on the basis of the data provision pattern information and the data usage pattern information (step S130), and determines a type of cell to be accessed according to the access type (step S140).

The UE selects a specific cell among cells having the determined cell type (step S150), and accesses the cell. Thereafter, the UE updates the date usage pattern information (step S160).

Now, each step of the aforementioned method will be described in detail.

[Method of Generating Data Usage Pattern Information of UE]

A UE may record an amount of data used by the UE for a specific time T1, and a movement speed at that time. The following table is a list indicating the movement speed of the UE for a specific time and a data usage amount at the movement speed. It is assumed that the UE can obtain a precise movement speed.

TABLE 1

| UE's movement speed | Data usage amount (kbytes) |
|---|---|
| V1 | 101 |
| V3 | 21.2 |
| . . . | . . . |
| V1 | 30.4 |

It is difficult for the UE to accurately measure its instantaneous speed, and also accuracy may not be guaranteed. Therefore, a UE speed may be determined in such a manner that the speed is divided into several durations and thereafter to which speed duration the UE belongs is recognized. For example, the speed duration may be divided into three durations as shown in the following table.

TABLE 2

| Parameter value | Speed duration [Km/h] |
|---|---|
| $V_1$ | $V = 0$ |
| $V_2$ | $0 < V < V_{th}$ |
| $V_3$ | $V_{th} < V$ |

Assume that the movement speed of the UE is V. If V=0, the UE records a parameter value $V_1$ to the list. If V is greater than 0 and less than a specific threshold $V_{th}$, a parameter value $V_2$ is recorded to the list. The specific threshold value may be set to an average movement speed of a vehicle, for example. That is, if the UE has a speed of a pedestrian level, the parameter value $V_2$ may be recorded to the list. If V is greater than $V_{th}$, a parameter value $V_3$ is recorded to the list. In addition, a data usage amount used at each time is also recorded to the list.

The values recorded to the list are valid only during the aforementioned pre-set time, and may be deleted and updated from the list when the pre-set time elapses after being recorded to the list.

Figure 3:
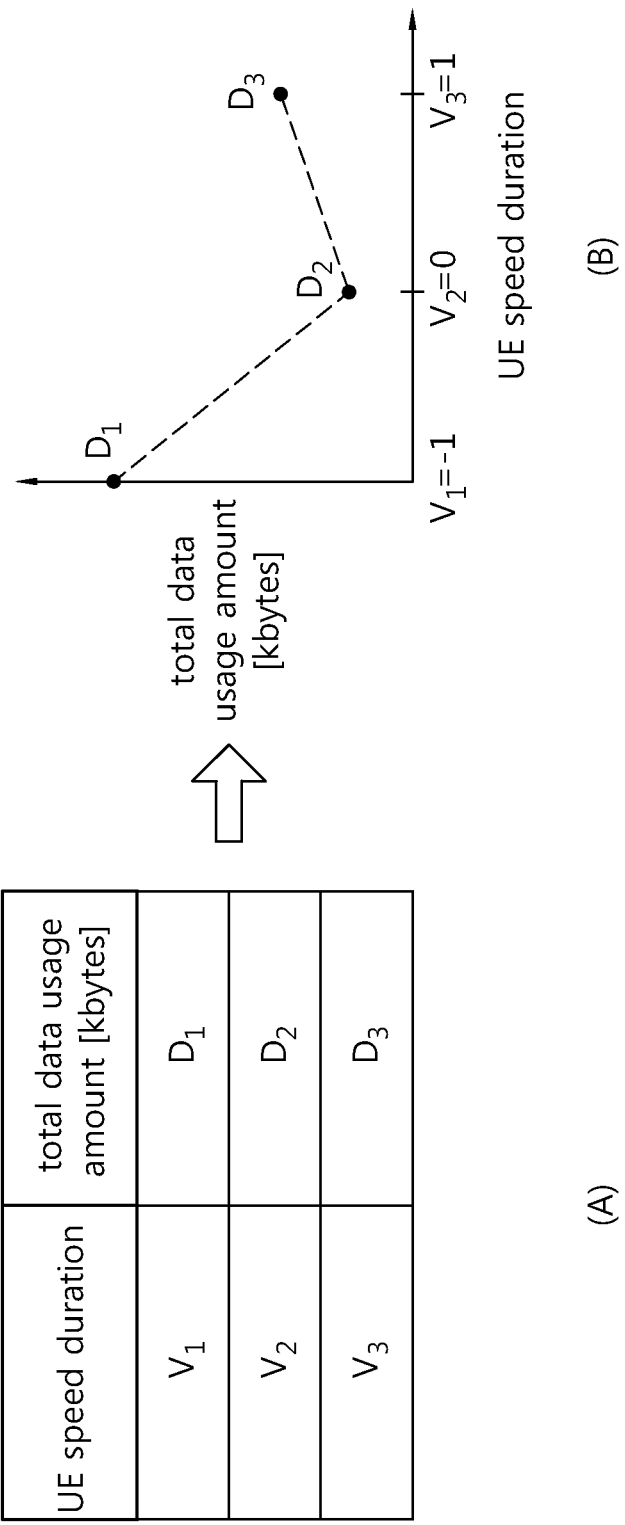
FIG. 3 shows an example of a list and graph representing a data usage amount for each speed duration of a UE during a specific time period.

FIG. 3 shows an example of a list and graph representing a data usage amount for each speed duration of a UE during a specific time period.

Referring to FIG. 3A, the UE may use data $D_1$ at a speed $V_1$, data $D_2$ at a speed $V_2$, and data $D_3$ at a speed $V_3$. In this case, a list may be created as shown in FIG. 3A.

The list represents a data usage amount for each speed of the UE. The list may be provided to a BS as data usage pattern information of the UE.

Meanwhile, when three points of (speed, data usage amount) in the aforementioned list are expressed on a coordinate in which the X axis denotes the speed of the UE and the Y axis denotes the data usage amount of the UE, it can be represented by FIG. 3B.

In this case, a quadratic curve that passes the three points may exist, and the data usage pattern information may be given as a feature value of the quadratic curve. In other words, the feature value of the quadratic curve connecting the points indicating the data usage amount for each UE speed may be provided to the BS as the data usage pattern information.

Figure 4:
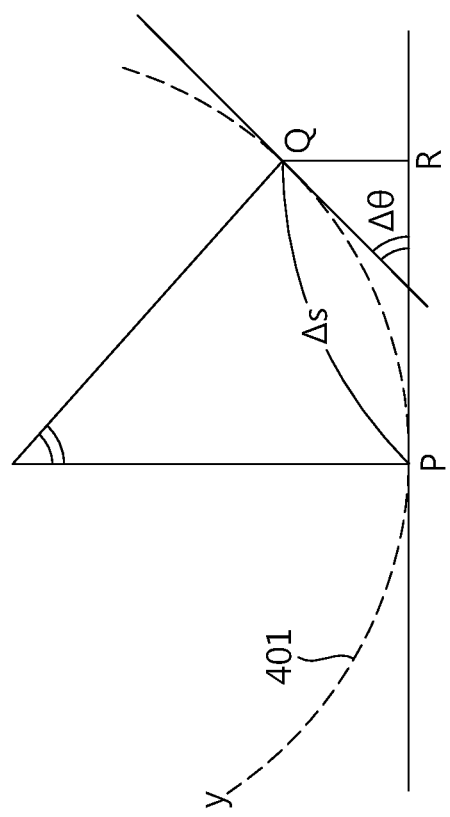
FIG. 4 shows an example of determining data usage pattern information.

FIG. 4 shows an example of determining data usage pattern information.

Referring to FIG. 4, assume that a quadratic curve 401 that passes three points is denoted by y. Then, a curvature at a point R of the y may be defined as expressed by $C_{user}$ of FIG. 4. In general, the quadratic curve 401 may be specified as a value indicating a scale together with the curvature. If the value indicating the scale is $r_{user}$, a value $D_2$ of FIG. 3A may be used as $r_{user}$.

That is, the data usage pattern information may be provided in a list form indicating a data usage amount per speed as shown in FIG. 3A, and may be provided by using the scale value $r_{user}$ and the curvature $C_{user}$ of the quadratic curve including the points indicating the values of the list described with reference to FIG. 4.

[Data Provision Pattern Information]

After a data usage amount per speed is provided from UEs to provide a service, a BS may calculate a data amount that can be provided per speed to a UE which intends to access thereto. The per-speed data amount that can be provided may also be provided in a form of a list or a feature value of a quadratic curve.

If the data provision pattern information provided by the BS is the feature value of the quadratic curve, it may be provided in a form of ($C_{sys}$, $r_{sys}$). $C_{sys}$ may be a curvature value of the quadratic curve, and $r_{sys}$ may be a scale value of the quadratic curve.

The data provision pattern information may be generated by a C-RAN which manages the BS. The C-RAN may receive the data usage pattern information from the UE and determine a required data pattern in a region managed by the C-RAN. Thereafter, a data provision pattern of each BS may be changed to fit the required data pattern of the region. This may be performed by using a method of changing a resource allocation type in a frequency domain or a time domain.

[Use of Data Usage Pattern and System's Data Provision Pattern]

A UE may determine an access type on the basis of data provision pattern information and data usage pattern information. The access type will be described below.

For example, when data is transmitted, the UE may measure its current speed duration, and may estimate an average data usage amount of the UE in the current speed duration by using the values $C_{user}$ and $r_{user}$ stored in the UE for a specific time period.

For example, a quadratic curve of which an axis of symmetry is $\delta_{user}$ ($0<\delta<\frac{1}{2}$) may be obtained by using the values $C_{user}$ and $r_{user}$ so that the data usage amount of the UE can be predicted in a convex form, and thereafter the data usage amount used in the current speed duration may be predicted.

For example, the following equation may be used.

$$f(C_{user}, r_{user}, v) = \begin{cases} D_1' = (1/2+\delta)C_{user} + r_{user}, & v = 0 \\ D_2' = r_{user}, & 0 < v < V_{th} \\ D_3' = (1/2-\delta)C_{user} + r_{user}, & V_{th} < v \end{cases} \quad \text{[Equation 1]}$$

Figure 5:
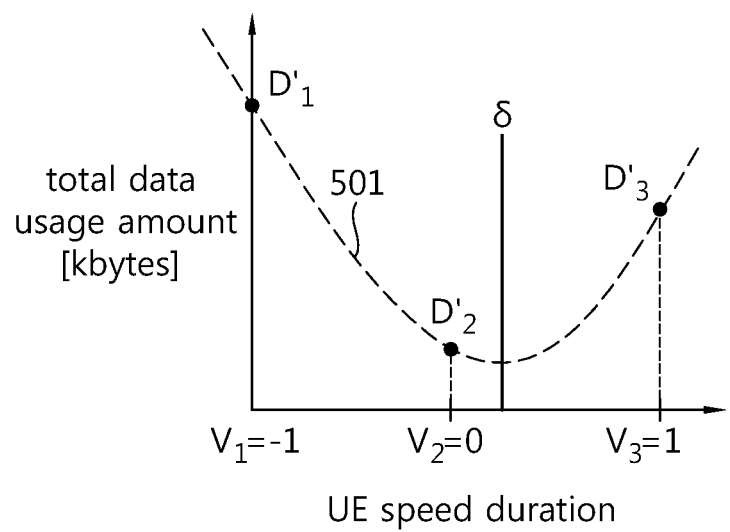
FIG. 5 shows an example of a graph for predicting a data usage amount per speed by a UE in a quadratic curve.

FIG. 5 shows an example of a graph for predicting a data usage amount per speed by a UE in a quadratic curve.

Referring to FIG. 5, the UE may obtain a quadratic curve 501 by using values $C_{user}$ and $r_{user}$, and thereafter may predict a data usage amount used in each speed duration. These predicted amounts are $D_1'$, $D_2'$, $D_3'$, etc., of FIG. 5.

If it is difficult for the UE to accurately measure a current speed, the current speed may be measured according to whether it is in a vehicle. For example, whether it is in the vehicle may be recognized by using a tag pre-installed in the vehicle and a tag recognizer installed in the UE, and thereafter whether the current speed is greater than or equal to a threshold speed may be determined according to whether it is in the vehicle.

In the same manner, data provision pattern information ($C_{sys}$, $r_{sys}$, $\delta_{sys}$, etc.) delivered from the BS may be used to calculate a data amount that can be provided to the system in each speed duration.

[Determining of UE Access Type]

Assume that a current speed duration of a UE is $V_i$, and a data usage amount prediction value at that speed is $D_i'$. In this case, the access type is determined by comparing $D_i'$ and a predicted data amount $S_i$ that can be provided in $V_i$.

Figure 6:
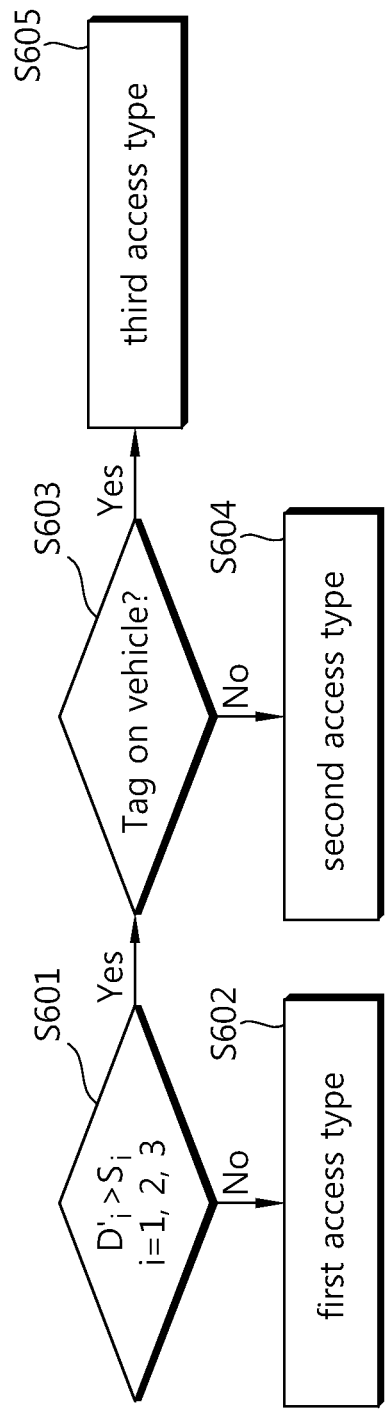
FIG. 6 shows an example of determining an access type.

FIG. 6 shows an example of determining an access type.

Referring to FIG. 6, a UE determines whether a data usage prediction value $D_i'$ is less than a data provision prediction amount $S_i$ (step S601). If less than that, the access type is determined to a first access type (step S602). If the data usage prediction value is greater than the data provision prediction value, the UE determines whether it is in a vehicle (step S603). If it is determined not to be in the vehicle, the access type is determined to a second access type (step S604). If the data usage prediction value is greater than the data provision prediction value and if it is determined to be in the vehicle, the access type is determined to a third access type (step S605).

[Method of Determining Type of Cell to be Accessed for Each Access Type]

If an access type is 1 or 2, a UE determines both a macro cell and a small cell as an accessible candidate BS (i.e., candidate cell).

If the access type is 3, it can be seen that a UE which uses a large amount of data moves at a high speed. Therefore, in case of accessing the small cell, an overhead occurs frequently, which may result in performance deterioration. Accordingly, the macro cell is limited to the accessible candidate BS (i.e., candidate cell).

[Method of Selecting Specific Cell Among Cells Having Determined Cell Type]

For each of accessible candidate BSs, a conditional value $Q_i$ may be calculated, and a BS for providing the highest value $Q_i$ may be accessed.

An example of calculating the value $Q_i$ is as follows.

$$\arg\max_{i \in S} Q_i = w_1\left(\frac{RSS_i}{\max_{i \in S}(RSS_i)}\right) + w_2\left(\frac{B_i/n_i}{\max_{i \in S}(B_i/n_i)}\right) + w_3\left(\frac{B_i/c_i}{\max_{i \in S}(B_i/c_i)}\right) \quad \text{[Equation 2]}$$

-continued $$c_i = \sum_{j=1}^{n_i} f(C_{user}^j, r_{min}^j, v^j)/\gamma^j$$

$$w_1 + w_2 + w_3 = 1$$

In the above equation, i denotes a set of accessible candidate BSs, where i∈S={1, 2, 3, ..., N}. $RSS_i$ indicates a signal strength received from an $i^{th}$ BS. $B_i$ denotes a bandwidth of the $i^{th}$ BS. $n_i$ denotes the number of users currently accessed to the $i^{th}$ BS. $\gamma^i$ denotes a data rate of a $j^{th}$ user accessed to the $i^{th}$ BS. $w_1$, $w_2$, and $w_3$ denote weight values.

Each step of the method of FIG. 2 is described above in detail. In summary, the UE determines an access type by comparing a data usage amount (this may be denoted by $f(C_{user}, r_{user}, v)$, where v is a UE's current speed or speed duration) predicted at a current speed on the basis of the data usage pattern information and a data providing available amount (this may be denoted by $f(C_{sys}, r_{sys}, v)$) predicted at the current speed. In addition, a suitable cell type is determined according to the access type, and a specific cell is selected from cells having the determined cell type.

If a serving cell is selected simply by using only a signal strength as in the conventional technique in a heterogeneous network in which a macro cell and a plurality of small cells coexist, there is a high possibility of selecting a small cell closest in distance to the UE. However, if a UE uses a large amount of data and moves at a high speed, there is a high possibility of experiencing many handovers during the use of the data.

Therefore, the present invention uses data usage pattern information of the UE and data provision pattern information of the BS, which are statistically extracted during a specific time period. That is, the UE predicts a data usage amount at a current speed by using the data usage pattern information, and predicts a data providing amount at the current speed by using the data provision pattern information. Thereafter, an access type of the UE is determined by comparing predicted values, and a cell suitable for the access type is selected. If there is a plurality of cells suitable for the access type, a specific cell is selected by comparing the condition of Equation 2.

According to the present invention, the data usage pattern of the UE and the data provision pattern of the BS are used to select a cell suitable for the UE. As a result, a quality of experience (QoE) of the UE can be improved.

A method of performing cell selection by a UE in a wireless communication system is described above. Hereinafter, it is described to control which wireless resource allocation type is used by each BS in the wireless communication system. That is, it is related to indicate which radio resource allocation type will be used for each of a plurality of BSs distributed to regions controlled/managed by the wireless communication system.

Figure 7:
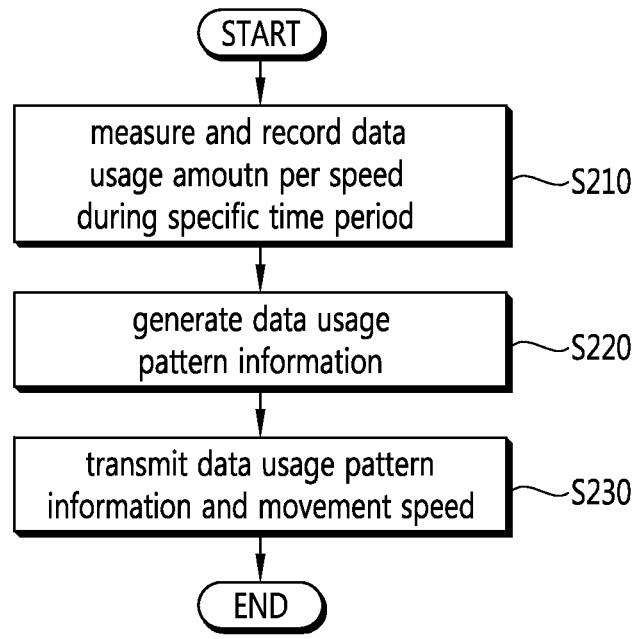
FIG. 7 shows a process of operating a UE according to an embodiment of the present invention.

FIG. 7 shows a process of operating a UE according to an embodiment of the present invention.

Referring to FIG. 7, the UE measures and records a data usage amount per speed during a specific time period (step S210).

The UE generates data usage pattern information (step S220), and transmits the generated data usage pattern information and a movement speed (step S230). The data usage pattern information and the movement speed may be delivered to a C-RAN via a BS or may be directly delivered to the C-RAN. The data usage pattern information may be generated on the basis of the data usage amount for each measured speed. A method of generating the data usage pattern information is described above. The data usage pattern information and information indicating the movement speed of the UE may be transmitted to the C-RAN together when the UE transmits data.

Figure 8:
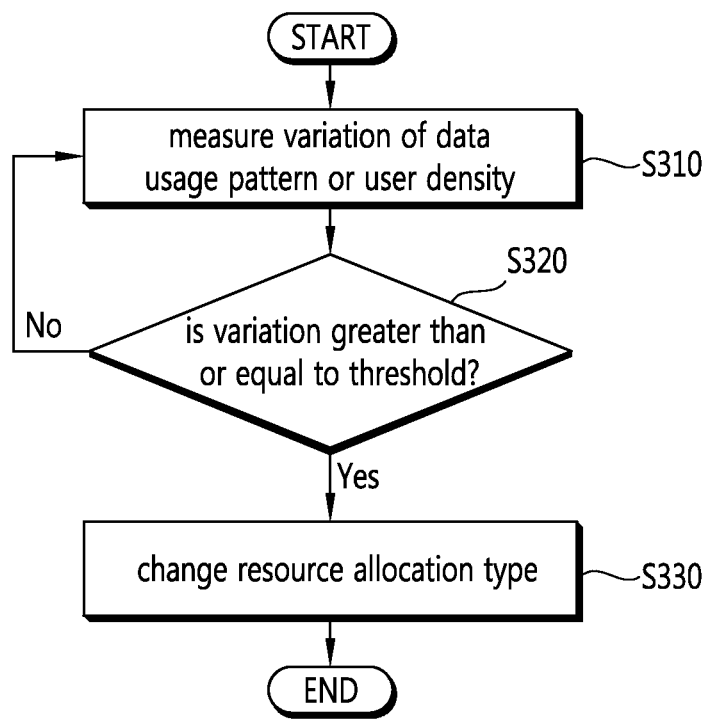
FIG. 8 shows a process of operating a C-RAN according to an embodiment of the present invention.

FIG. 8 shows a process of operating a C-RAN according to an embodiment of the present invention.

Referring to FIG. 8, the C-RAN measures a change in a user density or a data usage pattern of a UE (step S310). For example, the change in the data usage pattern may be obtained as a difference between a previous average value and a current average value by obtaining an average of a data usage pattern of UEs every time $T_3$. In addition, the density change of the UEs may be obtained such that a value ($C_{sys}$, $r_{sys}$) is obtained every time $T_4$ and a previous value is compared with a current value.

The C-RAN determines whether a variation is greater than or equal to a threshold (step S320), and if so, changes a resource allocation type (step S330). The changing of the resource allocation type is to change the resource allocation type such that a data provision pattern of a BS conforms to a required data pattern of UEs in a region. The changing of the resource allocation type may be performed in a frequency domain or a time domain. The changing of the resource allocation type in the frequency domain may be to change a carrier allocated to a UE among available carriers of the BS. The changing of the resource allocation type in the time domain may be to regulate an ABS ratio. Although the frequency domain and the time domain are distinguished to describe the above example, the present invention is not limited thereto. That is, the resource allocation type may also be changed simultaneously in the frequency domain and the time domain.

If the variation is less than the threshold, the change in the data usage pattern or the user density is measured again.

Hereinafter, each step of FIG. 8 is described in detail.

First, a C-RAN recognizes and stores a density of a macro cell and a small cell installed in a management region. The C-RAN recognizes a width of a region to be managed, and recognizes the number of macro cells (i.e., macro BSs) and the number of small cells (i.e., small BSs) to be managed. Thereafter, a density of the macro cell and small cell of the region to be managed may be calculated and stored.

The following table is an example of a list stored by the C-RAN by recognizing the density of the macro cell and the small cell.

TABLE 3

| Symbol | Density | Description |
|---|---|---|
| $\lambda_M$ | 30 units/km² | Density of macro cell |
| $\lambda_S$ | 160 units/km² | Density of small cell |

[Method of Recognizing Density of User Who Uses Data]

The C-RAN periodically recognizes and stores a density of a user who uses data.

First, the C-RAN recognizes a width of a region to be managed. Then, the C-RAN may configure a list of the following table on the basis of speed information transmitted by users (i.e., UEs) of the region to be managed.

TABLE 4

| Speed (km/h) | The number of users (persons) |
|---|---|
| $V_1$ | 4 |
| $V_2$ | 1 |
| $V_3$ | 2 |

In Table 4, $V_1$ may denote a stationary state, $V_2$ may denote a slow state, and $V_3$ may denote a fast state. A list of the above table is newly updated every time.

The C-RAN recognizes a user density for each speed duration by using the number of users for each speed duration as shown in Table 4. This result may be configured by the following list.

TABLE 5

| Symbol | Density | Description |
|---|---|---|
| $\mu_{st}$ | 89 persons/km² | Stationary = $V_1$, density of user |
| $\mu_{sl}$ | 8.4 persons/km² | Slow = $V_2$, density of user |
| $\mu_{fa}$ | 10 persons/km² | Fast = $V_3$, density of user |

[Method of Calculating Data Amount that can be Provided to Management Region]

The C-RAN calculates a data provision amount ($C_{sys}$, $r_{sys}$) that can be provided in a network by using a density of a macro cell and a small cell and a user density for each speed duration.

Figure 9:
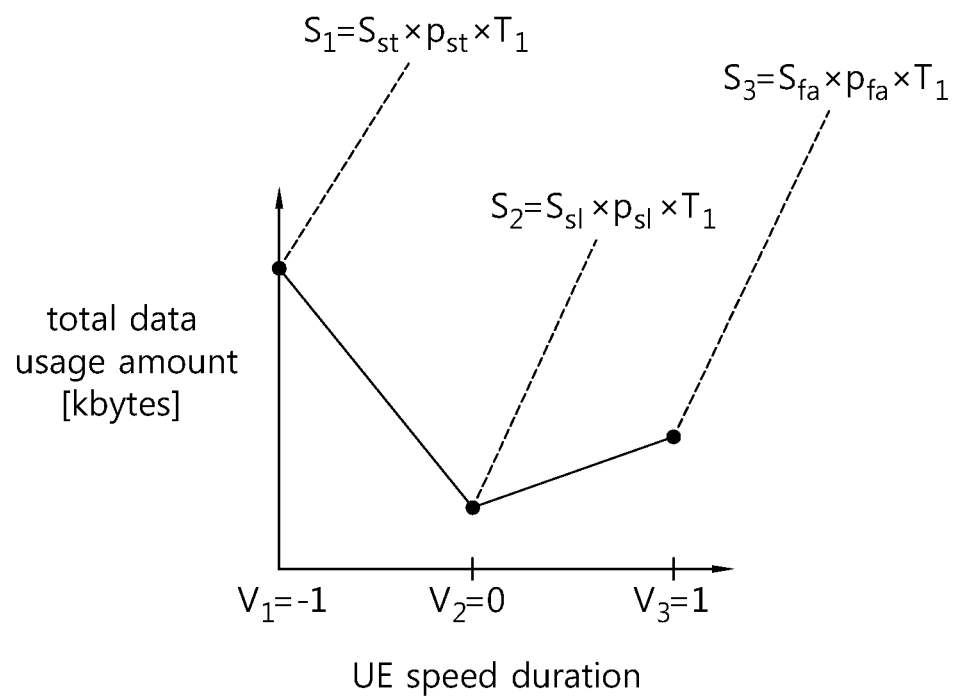
FIG. 9 shows an example of representing a data provision amount that can be provided by a system for each speed duration.

FIG. 9 shows an example of representing a data provision amount that can be provided by a system for each speed duration.

$S_1$ denotes a data amount provided by the system when a user is stationary. $S_2$ denotes a data amount provided by the system when the user moves at a slow speed. $S_3$ denotes a data amount provided by the system when the user moves at a fast speed.

$S_1$ may be calculated by $S_{st} \times p_{st} \times T_1$. $S_2$ may be calculated by $S_{sl} \times p_{sl} \times T_1$. $S_3$ may be calculated by $S_{fa} \times p_{fa} \times T_1$. $T_1$ may be a time determined for the UE to measure a data usage amount for each speed duration. Each parameter required to calculate $S_1$, $S_2$, and $S_3$ is described below.

Referring back to FIG. 9, three points $(V_1, S_1)$, $(V_2, S_2)$, and $(V_3, S_3)$ may be represented on a coordinate in which an X axis denotes a movement speed of a UE and a Y axis denotes a data amount provided by a system. In addition, a quadratic curve connecting these three points may be defined.

A curvature of the quadratic curve may be denoted by $C_{sys}$, and a scale may be denoted by $r_{sys}$. $r_{sys}$ may use a value $S_2$.

Hereinafter, a method of calculating $S_1$, $S_2$, and $S_3$, and parameters required thereto are described.

TABLE 6

| Parameter (symbol) | Description |
|---|---|
| $\lambda_M$, $\lambda_S$ | Density of macro cell/small cell |
| $\mu_{st}$, $\mu_{sl}$, $\mu_{fa}$ | Density of users in stationary/slow/fast state |
| $p_{st}$, $p_{sl}$, $p_{fa}$ | Probability of being in stationary/slow/fast state |
| $\theta$ | Probability of accessing macro cell by user |
| $S_{st}$, $S_{sl}$, $S_{fa}$ | Data rate for user in stationary/slow/fast state |
| $P_M$, $P_S$ | Transmit power of macro cell/small cell |
| $B_M$, $B_S$ | Bandwidth of macro cell/small cell |
| $\gamma$ | Target SINR |
| $p^{(1)}_{service}$ | Probability of successful transmission by accessing macro cell |
| $p^{(2)}_{service}$ | Probability of successful transmission by accessing small cell |
| $\Gamma^{(1)}$ | Ratio of bandwidth allocated to one macro cell in $B_M$ |
| $\Gamma^{(2)}$ | Ratio of bandwidth allocated to one small cell in $B_S$ |

$S_{st}$, $S_{sl}$, and $S_{fa}$ may be defined as follows.

$$S_{st} = \theta \cdot B_M \cdot p_{service}^{(1)} \cdot \log_2(1+\gamma) + (1-\theta) \cdot B_S \cdot p_{service}^{(2)} \cdot \log_2(1+\gamma)$$

$$S_{sl} = \theta \cdot B_M \cdot p_{service}^{(1)} \cdot \log_2(1+\gamma) + (1-\theta) \cdot B_S \cdot p_{service}^{(2)} \cdot \log_2(1+\gamma)$$

$$S_{fa} = B_M \cdot p_{service}^{(1)} \cdot \log_2(1+\gamma) \quad \text{[Equation 3]}$$

Meanwhile, $p^{(1)}_{service}$ may be determined by the following equation.

$$p_{service}^{(i)} = \frac{1 - (1 + 3.5^{-1}\mu_{(i)}/\lambda_{(i)})^{-3.5}}{\mu_{(i)}/\lambda_{(i)}(1 + (1 - (1 + 3.5^{-1}\mu_{(i)}/\lambda_{(i)})^{-3.5})k')}, \quad \text{[Equation 4]}$$

$$i = 1, 2$$

where $k' = \sqrt{\gamma}(\pi/2 - \arctan(1/\sqrt{\gamma}))$ $\mu_{(1)} = \mu_{fa} + \theta(\mu_{st} + \mu_{sl})$ $\mu_{(2)} = (1-\theta)(\mu_{st} + \mu_{sl})$ $\lambda_{(1)} = \mu_M, \lambda_{(2)} = \lambda_S$ In addition, $\theta$ and $p_{st}$, $p_{sl}$, $p_{fa}$ may be determined by the following equation.

$$\theta = \frac{\lambda_M P_M^{2/\alpha}}{\lambda_M P_M^{2/\alpha} + \lambda_S P_S^{2/\alpha}} \quad \text{[Equation 5]}$$

$$p_{st} = \frac{\mu_{st}}{\mu_{st} + \mu_{sl} + \mu_{fa}}$$

$$p_{sl} = \frac{\mu_{sl}}{\mu_{st} + \mu_{sl} + \mu_{fa}}$$

$$p_{fa} = \frac{\mu_{fa}}{\mu_{st} + \mu_{sl} + \mu_{fa}}$$

Now, it will be described a method of calculating a required data pattern of a region on the basis of the user's data usage pattern ($C_{sys}$, $r_{sys}$) collected by the C-RAN.

The C-RAN may calculate an average of collected data usage patterns of respective users to obtain the required data pattern to be managed. That is, if required data pattern information indicating the required data pattern is denoted by ($C_{user,dem}$, $r_{user,dem}$), then $C_{user,dem}$ may be obtained by averaging $C_{sys}$ values of the respective users. In addition, $r_{user,dem}$ may be obtained by averaging $r_{sys}$ values of the respective users. Since the required data pattern of the managed region varies over time, it is newly updated every time $T_3$ so as to keep the latest pattern.

Now, an example of changing a resource allocation type in a C-RAN will be described. There may be a method of controlling a frequency allocation type and a method of regulating an ABS ratio.

[Method of Changing Data Amount Provided by Controlling Frequency Allocation Type]

A data amount that can be provided by a system to a user may change according to a frequency allocation type indicated by a C-RAN to a BS.

Figure 10:
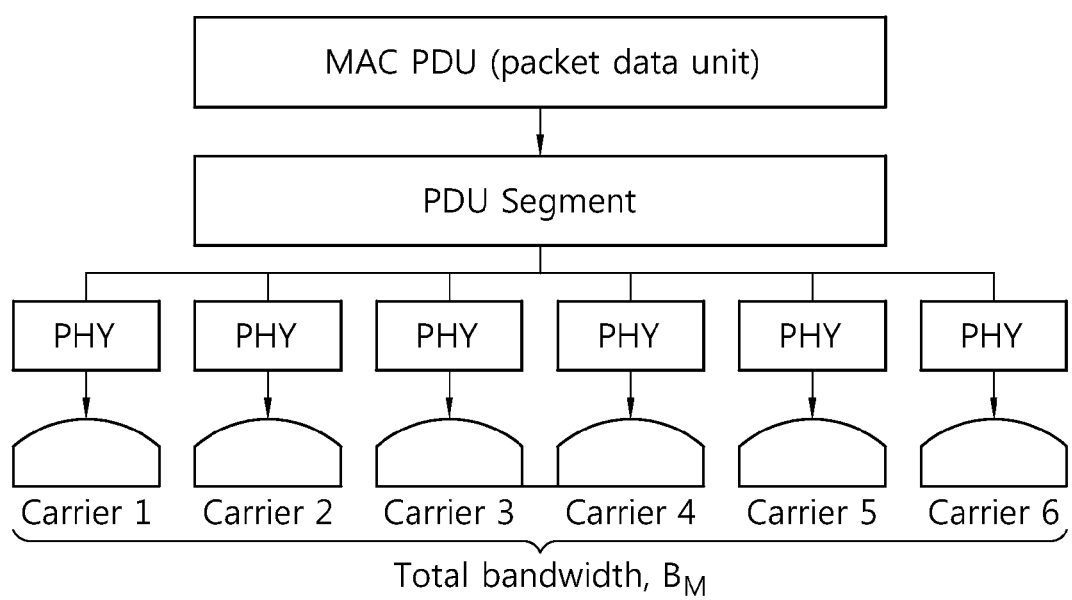
FIG. 10 shows an example of carriers allocated to a macro cell.

FIG. 10 shows an example of carriers allocated to a macro cell.

Referring to FIG. 10, a bandwidth of the macro cell is denoted by $B_M$, and $B_M$ may consist of 6 carriers. In this case, if a C-RAN sets a bandwidth ratio $\Gamma^{(1)}$ allocated to one macro cell to 1 in $B_M$, all macro cells (i.e., macro BSs) of a region managed by the C-RAN may process data of an accessing user by using all of carriers 1 to 6. Alternatively, if $\Gamma^{(1)}$ is set to ⅓, all macro cells managed by the C-RAN may process the data of the accessing user by using only ⅓ (i.e., two carriers) of the carriers 1 to 6. For example, the BS may provide a service by using two carriers such as carriers 1 and 2, or carriers 3 and 4.

According to $\Gamma^{(2)}$ which is set by the C-RAN, the small cells may provide a service in some bands of a frequency $B_S$ allocated for the small cells.

In a sense that the data provision cell of the macro cell and the small cell in the region managed by the C-RAN can be indicated according to $\Gamma^{(1)}$ and $\Gamma^{(2)}$, it can be expressed by $C_{sys}(\Gamma^{(1)}, \Gamma^{(2)})$.

The C-RAN changes $(C_{sys}, r_{sys})$ to conform to $(C_{user,dem}, r_{user,dem})$ by regulating a frequency allocation type of a management region. For example, the C-RAN may set $\Gamma^{(1)}$ and $\Gamma^{(2)}$ to satisfy $C_{sys}(\Gamma^{(1)},\Gamma^{(2)})=C_{user,dem}$, $(\Gamma^{(1)},\Gamma^{(2)})=r_{user,dem}$. That is, a carrier is allocated with a ratio of $\Gamma^{(1)}$ in an available bandwidth $B_M$ to a managed macro cell. A carrier is allocated with a radio of $\Gamma^{(2)}$ in an available bandwidth $B_S$ to the small cell.

[Changing of Data Amount Provided by Control of ABS Ratio]

An almost blank subframe (ABS) implies a subframe in which a data channel does not exist. A control channel and a data channel coexist in a typical subframe, but the data channel does not exist in the ABS.

A data amount that can be provided to a user in a system may be changed when a C-RAN regulates an ABS ratio of a BS. For example, the ABS ratio may be a ratio by which the ABS is allocated in a frame transmitted by the BS to a UE.

Figure 11:
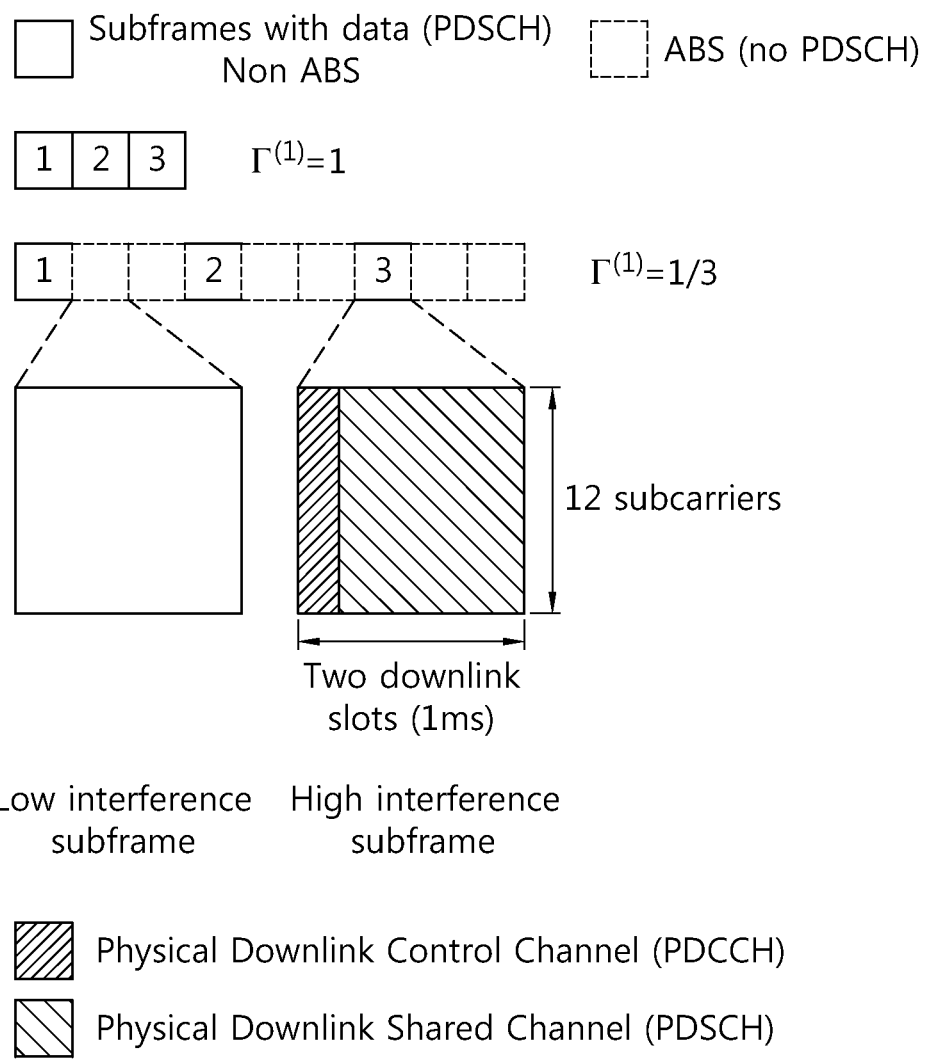
FIG. 11 shows an example of allocating an ABS ratio in a macro cell.

FIG. 11 shows an example of allocating an ABS ratio in a macro cell.

If $\Gamma^{(1)}$ is 1, all subframes in a frame are normal subframes, and an ABS does not exist. Meanwhile, if $\Gamma^{(1)}$ is ⅓, then ⅓ of subframes in the frame are ABSs. This results in a decrease in a time for transmitting actual data by a macro cell to a ratio of ⅓. A ratio of a frame which actually interferes among all frames is decreased to ⅓.

The small cells may transmit a frame including data only in a time of a specific ratio during a limited time by regulating the ABS ratio according to $\Gamma^{(2)}$ determined by the C-RAN.

The C-RAN may change $(C_{sys}, r_{sys})$ to conform to $(C_{user,dem}, r_{user,dem})$ by regulating a time resource allocation type of a management region (i.e., by regulating the ABS ratio).

The C-RAN may determine $\Gamma^{(1)}$ and $\Gamma^{(2)}$ to satisfy $C_{user,dem}=C_{sys}(\Gamma^{(1)},\Gamma^{(2)})$, $r_{user,dem}=(\Gamma^{(1)},\Gamma^{(2)})$. The ABS is allocated such that a frame including data is transmitted with a ratio of $\Gamma^{(1)}$ to the managed macro cell during a total time period. The ABS ratio is regulated such that the frame including the data is transmitted with a ratio of $\Gamma^{(2)}$ to the small cell during the total time period. Herein, $\Gamma^{(1)}$ and $\Gamma^{(2)}$ may be interpreted as parameters representing the ABS ratio unlike FIG. 10.

Figure 12:
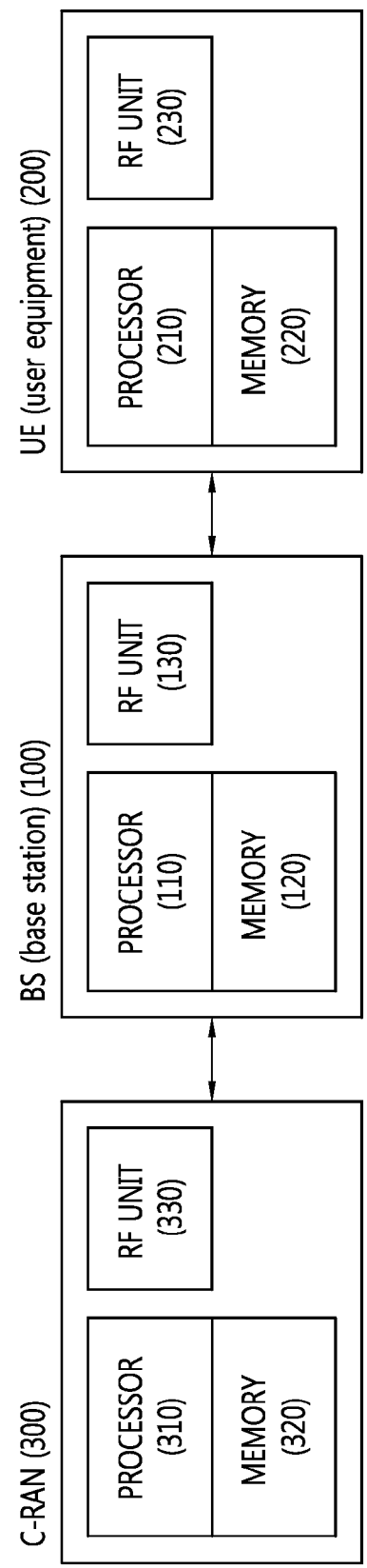
FIG. 12 is a block diagram of a BS and a UE according to an embodiment of the present invention.

FIG. 12 is a block diagram of a BS and a UE according to an embodiment of the present invention.

A BS 100 includes a processor 110, a memory 120, and a radio frequency (RF) unit 130. The processor 110 implements the proposed functions, procedures, and/or methods. Layers of a radio interface protocol may be implemented by the processor 110. The memory 120 is coupled to the processor 110, and stores a variety of information for driving the processor 110. The RF unit 130 is coupled to the processor 110, and transmits and/or receives a radio signal.

A UE 200 includes a processor 210, a memory 220, and an RF unit 230. The processor 210 implements the proposed functions, procedures, and/or methods. Layers of a radio interface protocol may be implemented by the processor 210. The memory 220 is coupled to the processor 210, and stores a variety of information for driving the processor 210. The RF unit 230 is coupled to the processor 210, and transmits and/or receives a radio signal. Further, the RF unit 230 transmits complex-valued modulation symbols which are spread to the BS as described above.

A C-RAN 100 may include a processor 310, a memory 320, and an RF unit 330. The processor 310 implements the proposed functions, procedures, and/or methods. Layers of a radio interface protocol may be implemented by the processor 310. The memory 320 is coupled to the processor 310, and stores a variety of information for driving the processor 310. The RF unit 330 is coupled to the processor 310, and transmits and/or receives a radio signal.

The processors 110, 210, and 310 may include an application-specific integrated circuit (ASIC), a separate chipset, a logic circuit, and/or a data processing unit. The memories 120, 220, and 320 may include a read-only memory (ROM), a random access memory (RAM), a flash memory, a memory card, a storage medium, and/or other equivalent storage devices. The RF units 130, 230, and 330 may include a base-band circuit for processing a radio signal. When the embodiment of the present invention is implemented in software, the aforementioned methods can be implemented with a module (i.e., process, function, etc.) for performing the aforementioned functions. The module may be stored in the memories 120, 220, and 320 may be performed by the processors 110, 210, and 310. The memories 120, 220, and 320 may be located inside or outside the processors 110, 210, and 310, and may be coupled to the processors 110, 210, and 310 by using various well-known means.

What is claimed is:

1. A method of allocating a resource in a wireless communication system, the method comprising:

measuring a variation of a data usage pattern or density of user equipments located in a region for providing a service;

determining whether the variation is greater than or equal to a threshold; and determining a resource allocation type of the region for providing the service on the basis of the determination result, wherein the resource allocation type is a type in which a base station included in the region for providing the service allocates the resource to the user equipments, and wherein the determining of the resource allocation type comprises:

calculating a required data pattern of the user equipments on the basis of an average value of data usage patterns of the respective user equipments located in the region for providing the service; and determining by the base station a ratio of a carrier to be allocated to each of the user equipments among available carriers on the basis of the required data pattern.

2. The method of claim 1, wherein the determining of the resource allocation type further comprises:

calculating a required data pattern of the user equipments on the basis of an average value of data usage patterns of the respective user equipments located in the region for providing the service; and determining a ratio of an almost blank subframe (ABS) not including a data channel among subframes included in a frame on the basis of the required data pattern.

3. The method of claim 1, wherein a data provision pattern based on the resource allocation type is determined on the basis of the data usage pattern or density of the user equipments located in the region for providing the service.

4. An apparatus comprising:

a radio frequency (RF) unit for transmitting or receiving a radio signal; and a processor operatively coupled to the RF unit, wherein the processor is configured to:

measure a variation of a data usage pattern or density of user equipments located in a region for providing a service;

determine whether the variation is greater than or equal to a threshold; and determine a resource allocation type of the region for providing the service on the basis of the determination result, wherein the resource allocation type is a type in which a base station included in the region for providing the service allocates the resource to the user equipments, and wherein the determining of the resource allocation type comprises:

calculating a required data pattern of the user equipments on the basis of an average value of data usage patterns of the respective user equipments located in the region for providing the service; and determining by the base station a ratio of a carrier to be allocated to each of the user equipments among available carriers on the basis of the required data pattern.

5. The apparatus of claim 4, wherein the determining of the resource allocation type further comprises:

calculating a required data pattern of the user equipments on the basis of an average value of data usage patterns of the respective user equipments located in the region for providing the service; and determining a ratio of an almost blank subframe (ABS) not including a data channel among subframes included in a frame on the basis of the required data pattern.

6. The apparatus of claim 4, wherein a data provision pattern based on the resource allocation type is determined on the basis of the data usage pattern or density of the user equipments located in the region for providing the service.

* * * * *